(12) United States Patent
Ahn

(10) Patent No.: US 6,252,786 B1
(45) Date of Patent: Jun. 26, 2001

(54) ELECTRIC POWER CONTROL METHOD AND CIRCUIT WITH CONTROLLED FADEOUT OF POWER CONSUMPTION

(76) Inventor: Chi-Myung Ahn, 101-102 Dongsan Apt., 134, Cheongdam-Dong, Kangnam-Ku, Seoul (KR)

( * ) Notice: Subject to any disclaimer, the term of this patent is extended or adjusted under 35 U.S.C. 154(b) by 0 days.

(21) Appl. No.: 09/301,111

(22) Filed: Apr. 28, 1999

(30) Foreign Application Priority Data

| Apr. 28, 1998 | (KR) | 98-6762 |
| Sep. 3, 1998 | (KR) | 98-36178 |
| Dec. 3, 1998 | (KR) | 98-52713 |

(51) Int. Cl.$^7$ .................................................. H02M 7/04
(52) U.S. Cl. ............................................. 363/84; 363/89
(58) Field of Search ................................ 363/78, 79, 81, 363/84, 89

(56) References Cited

U.S. PATENT DOCUMENTS

| 3,882,370 | * | 5/1975 | McMurray | 363/135 |
| 4,369,403 | * | 1/1983 | Lee | 318/729 |
| 4,449,079 | * | 5/1984 | Erdman | 318/138 |
| 4,728,866 | * | 3/1988 | Capewell et al. | 315/224 |
| 5,726,558 | * | 3/1998 | Umeda et al. | 322/27 |
| 5,969,962 | * | 10/1999 | Gabor | 363/89 |

* cited by examiner

Primary Examiner—Adolf Deneke Berhane
(74) Attorney, Agent, or Firm—Flehr Hohbach Test Albritton & Herbert LLP

(57) ABSTRACT

A method of controlling a supply of electric power to an electric load and a circuit thereof are disclosed. The circuit includes a control voltage generating part means for generating a control voltage which decreases over time, an amassing part for amassing the control voltage upon a voltage signal increasing over time and discharging the amassed voltage nearby a zero crossing point of AC voltage from the AC source in order to generate a saw-tooth wave, a trigger signal generating part for generating trigger signals based on the saw-tooth wave, wherein the phase angle of the trigger signals varies depending on the saw-tooth wave, and a switch part for supplying electric energy from the AC power source to the electric load in response to the trigger signals. Therefore, electric power being supplied to an electric load fades out.

11 Claims, 15 Drawing Sheets

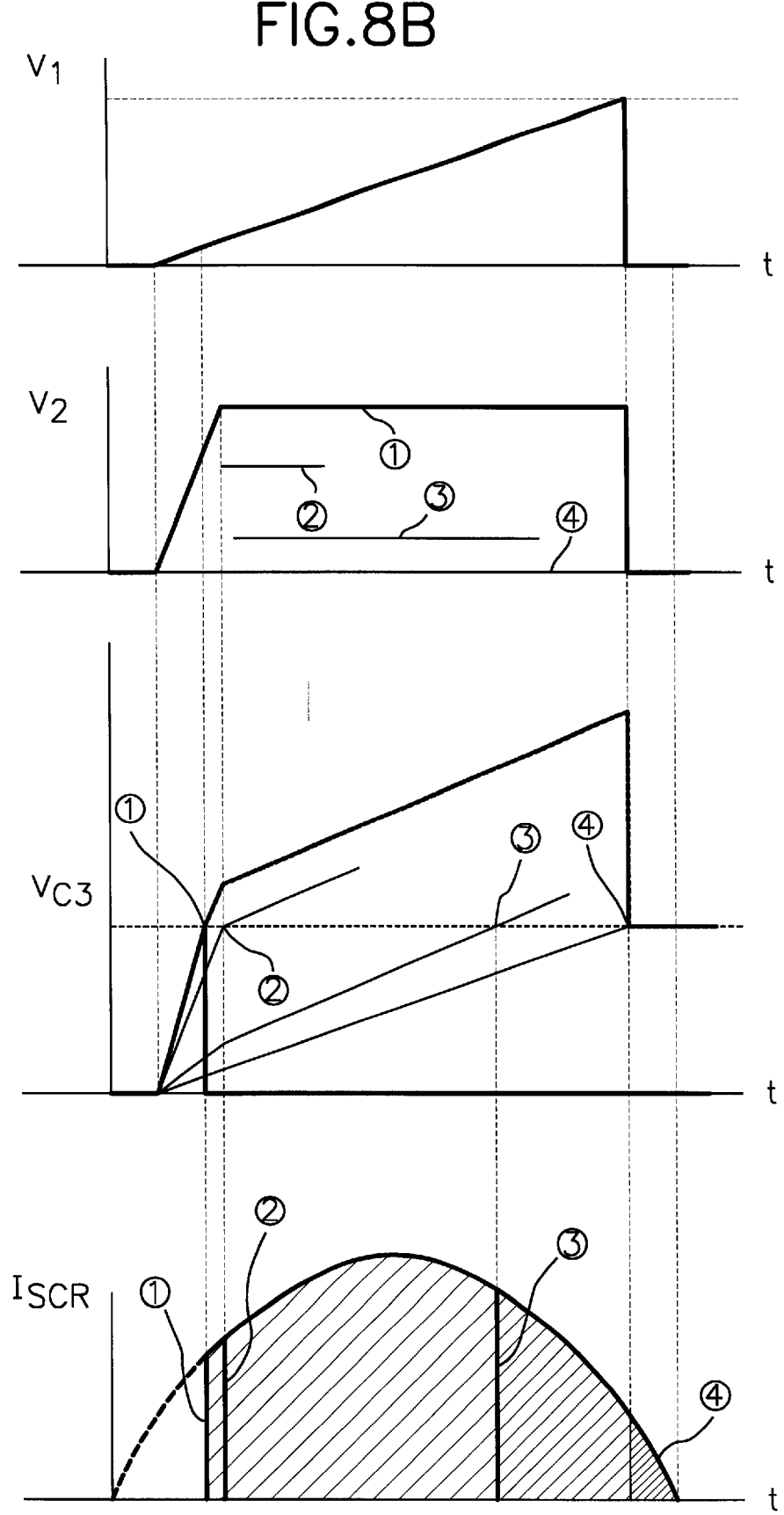

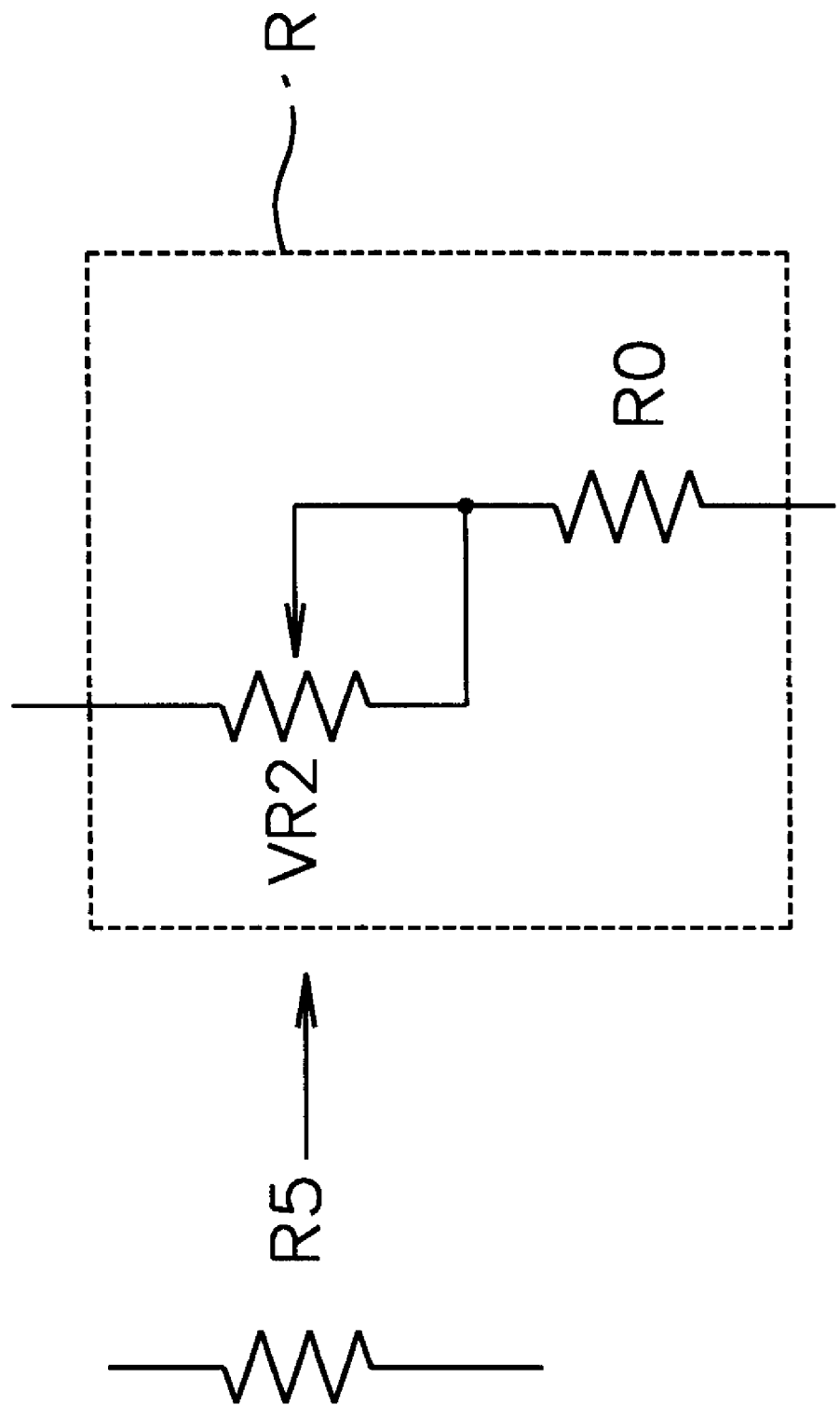

ELECTRIC POWER CONTROL METHOD AND CIRCUIT WITH CONTROLLED FADEOUT OF POWER CONSUMPTION

BACKGROUND OF THE INVENTION

1. Field of the Invention

The present invention relates to a method of controlling a supply of electric power to an electric load and a circuit thereof. More particularly, the present invention relates to a method which controls a phase of AC voltage being supplied to the electric load at every cycle of the AC voltage in order to fade out the power consumption of electric energy of the load for a predetermined time period, and a circuit which performs the method.

2. Prior Art

Generally, an electric device, such as an electric lamp, an electric heater or the like, is powered on or off by an on/off switch. In case of the electric lamp, a variable resistor is used for controlling the brightness of lamp, and a power switch is used for turning on the lamp, such that a user can reduce the brightness of the lamp or turn off the lamp before sleeping.

On the other hand, the facility and utility of lamps have been improved as a lamp having a function of a timer. The function of timer of the lamp may be used in sleeping. That is, when a user sets a turn-off time of the lamp, the needless lighting of the lamp is prevented.

FIG. 1 is a view for showing a circuit of a conventional power control circuit for an electric lamp.

Referring to FIG. 1, the circuit includes a time setting part 71, a reference voltage generation part 72, a comparing part 70, and a driving part 73. The time setting part 71 includes a resistor and a capacitor for setting a time period of supplying power to a lamp LP. The time period is achieved by a time constant of the resistor and the capacitor. The reference voltage generation part 72 generates a reference voltage which is used for determining whether a discharging voltage of the capacitor is greater than the reference voltage. The comparing part 70 compares the discharging voltage with the reference voltage, and outputs a voltage. The driving part 73 turns on or off the lamp LP according to the voltage based on the comparison result of the comparing part 70.

Further, the reference voltage generation part 72 includes resistors R2 and R3 and a diode D.

The time setting part 71 includes the resistor R1, the capacitor C1, and a variable resistor VR. The time constant of the time setting part 71 is adjusted by the variable resistor VR.

The comparing part 70 includes an operational amplifier OP and two resistors R4 and R5 for comparing the reference voltage with the discharging voltage.

The driving part 73 is a switching device such as a triac or the like.

Hereinafter, the operation of the circuit will be described.

When the driving part 73 is turned off, the AC source AC is not applied to the lamp LP. When the switch SW is switched on by a user, the capacitor is charged with electric energy which is supplied through the resistor R1 from the DC source Vcc.

At the same time, the operational amplifier OP outputs a high level of voltage to the triac T of the driving part 73 because of a voltage difference between the two terminals of resistor R2, such that the AC power is supplied from the AC source to the lamp LP.

When the switch SW is switched off, the capacitor starts to discharge the charged energy thereof to the variable resistor VR. However, although the switch SW is switched off, the operational amplifier OP continuously outputs the voltage of high level until the value of the discharging voltage is less than that of the reference voltage.

As the discharging voltage of the capacitor C is gradually decreased, the difference between the reference and discharging voltages is decreased, too. Therefore, by varying the resistance value of the variable resistor VR, the time constant of the time setting part 71 is determined, such that the light time of the lamp LP is adjustable.

As the voltage of the non-inverting terminal is decreased, the voltage value is less than that of the reference voltage, such that the operational amplifier OP outputs a low level voltage. As the result of outputting the low level voltage, the gate voltage of the triac T drops down to zero, such that the lamp LP is turned off.

Therefore, the circuit controls the power supply of the lamp as one example of electric loads by directly either connecting or disconnecting the AC source with the lamp, or turning off the lamp when a time set by a timer passes since the lamp is turned on.

However, the control circuit has problems that the lamp is abruptly turned off so that the eye of a user may be stimulated by the abrupt variation of the brightness, and the power consumption of the circuit is much more.

SUMMARY OF THE INVENTION

It is an object of the present invention to provide a method of controlling electric power which can fade out electric power being supplied to an electric load.

It is an other object of the present invention to provide a circuit for controlling electric power which can fade out an electric power being supplied to an electric load.

In order to achieve the above objects, a circuit according to one aspect of the present invention includes means for generating a control voltage which decrease with time; means for accumulating a charge a the control voltage upon a voltage signal increasing with time and discharging an accumulating charge nearby a zero crossing point of AC voltage from the AC source in order to generate a saw-tooth wave; means for generating trigger signals based on the saw-tooth wave, wherein the phase angle of the trigger signals varies dependent on the saw-tooth wave; and means for supplying an electric energy from the AC power source to the electric load in response to the trigger signals.

A method according to another aspect of the present invention includes the steps of: a) making a control voltage which decreases with time; b) accumulating a charge from the control voltage upon a voltage signal increasing with time and discharging an accumulated charge nearby a zero crossing point of AC voltage from the AC source in order to generate a saw-tooth wave; c) generating trigger signals based on the saw-tooth wave, wherein the phase angle of the trigger signals varies dependent on the saw-tooth wave; and d) supplying an electric energy from the AC power source to the electric load in response to the trigger signals.

According to the present invention, there are provided a circuit and a method for controlling electric power which can fade out electric power being supplied to an electric load.

BRIEF DESCRIPTION OF THE DRAWINGS

This invention will be better understood and its various objects and advantages will be more fully appreciated from the following description taken in conjunction with the accompanying drawings, in which:

FIG. 8B is a wave form for illustrating the circuit of the FIG. 8A;

FIG. 9A is a view for showing another example of the voltage dividing part;

DETAILED DESCRIPTION OF THE PREFERRED EMBODIMENT

Preferred embodiments of the present invention will be illustrated below with reference to the accompanying drawings.

Figure 1:
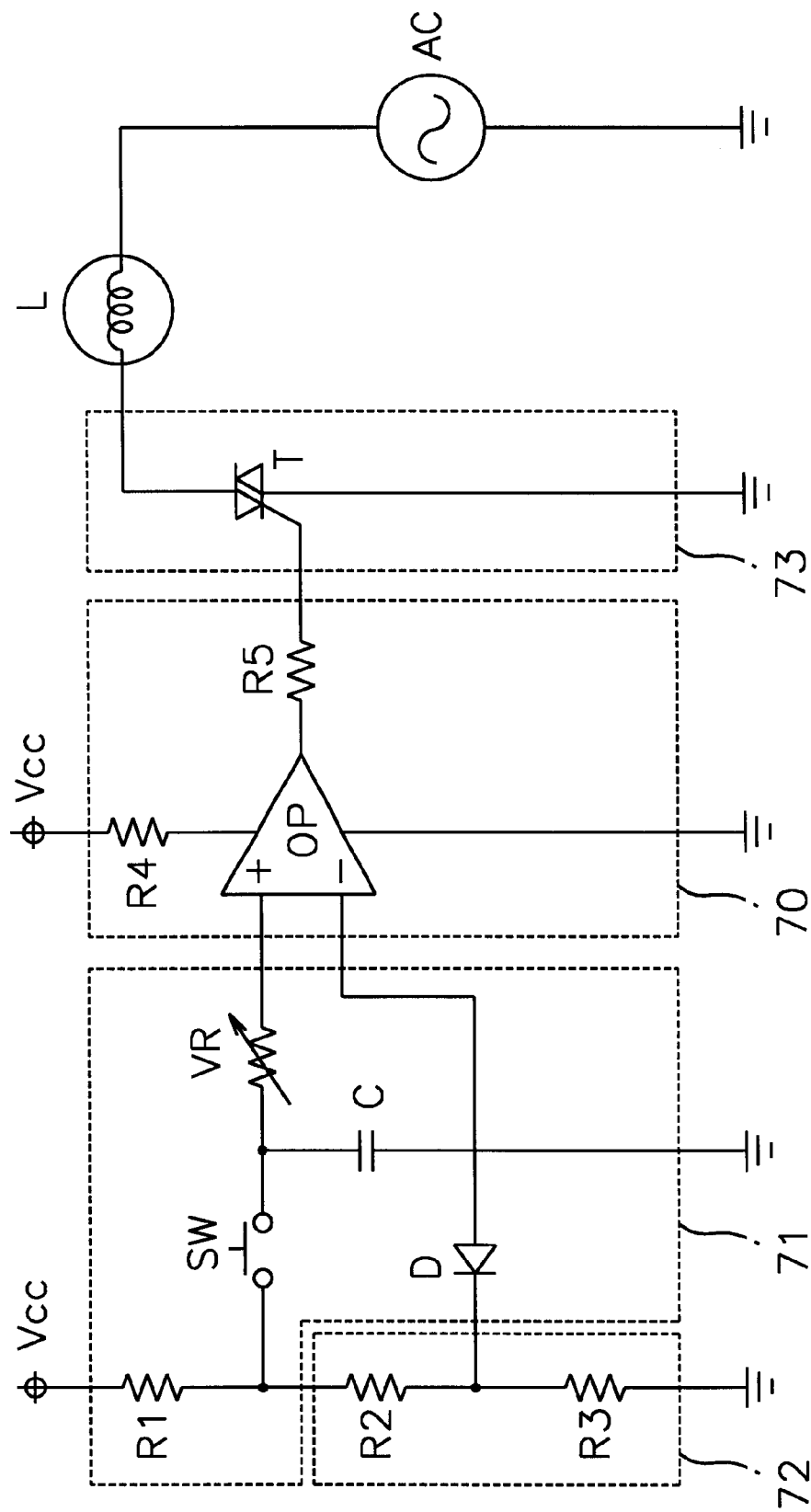
FIG. 1 is a view for showing a circuit of a conventional power control circuit for an incandescent electric lamp.
Figure 2:
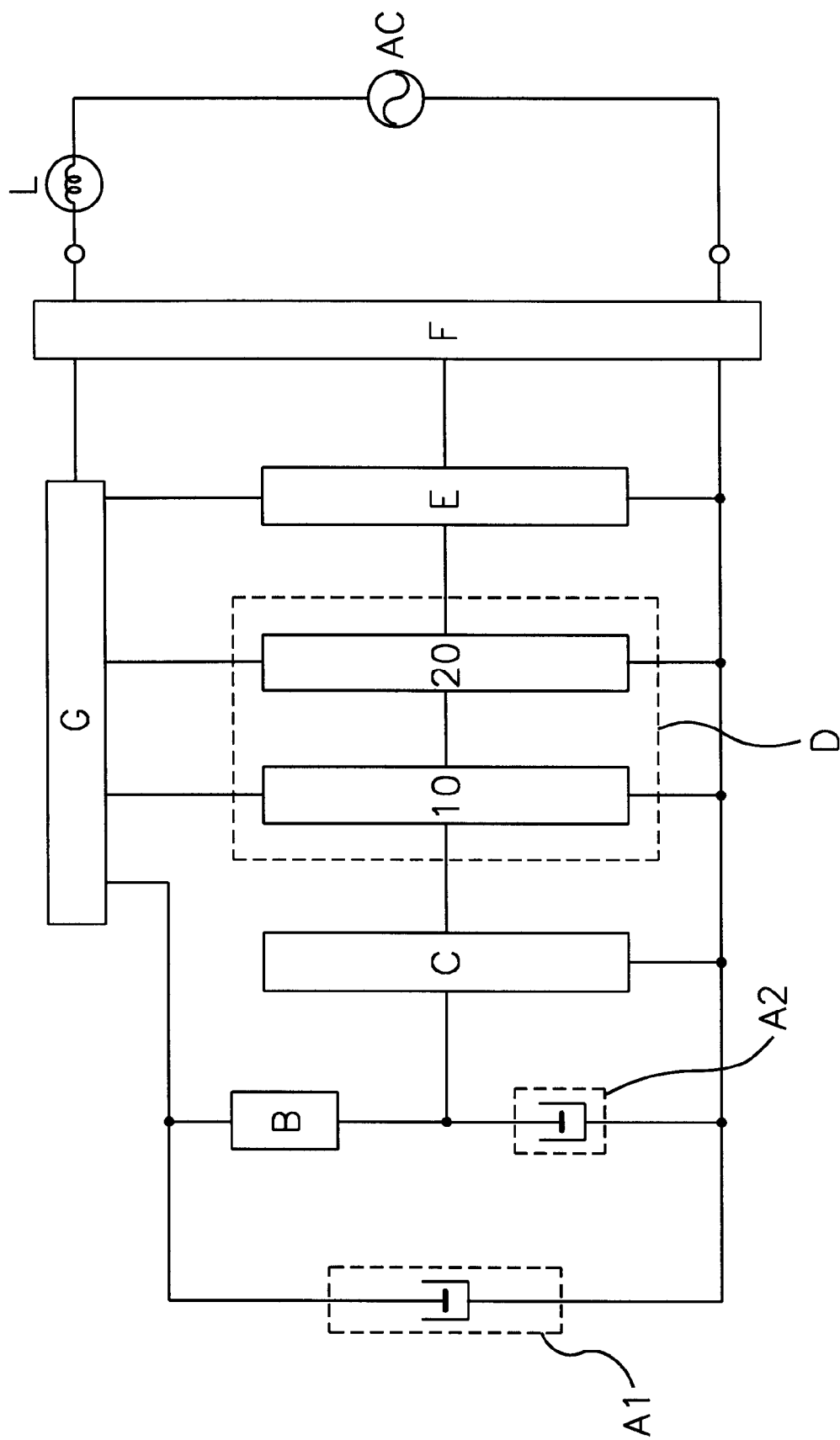
FIG. 2 is a block diagram for illustrating the functions of the present invention.
Figure 3:
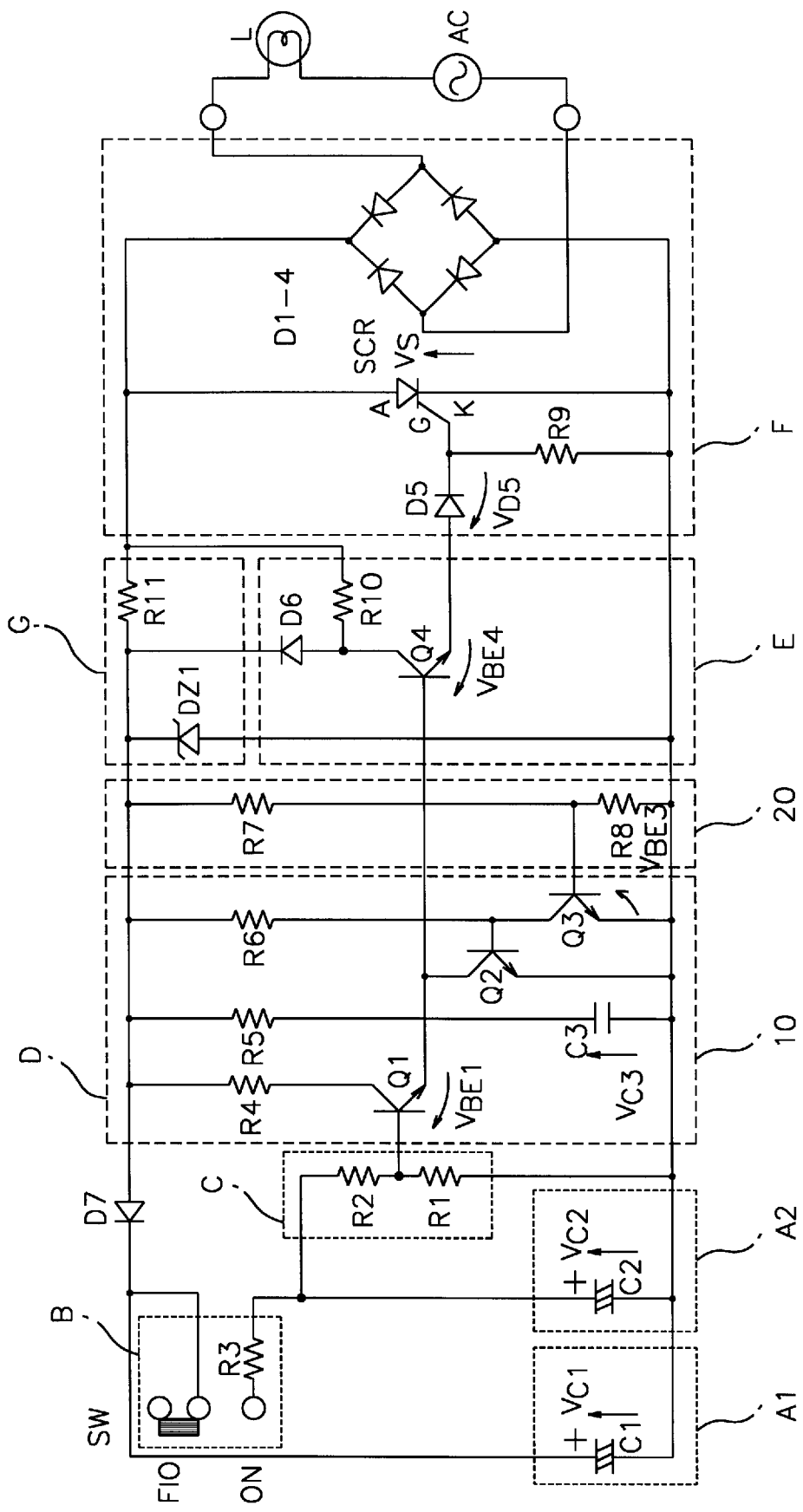
FIG. 3 is a view of showing a circuit according to one example of the block diagram depicted in FIG. 2.
Figure 4:
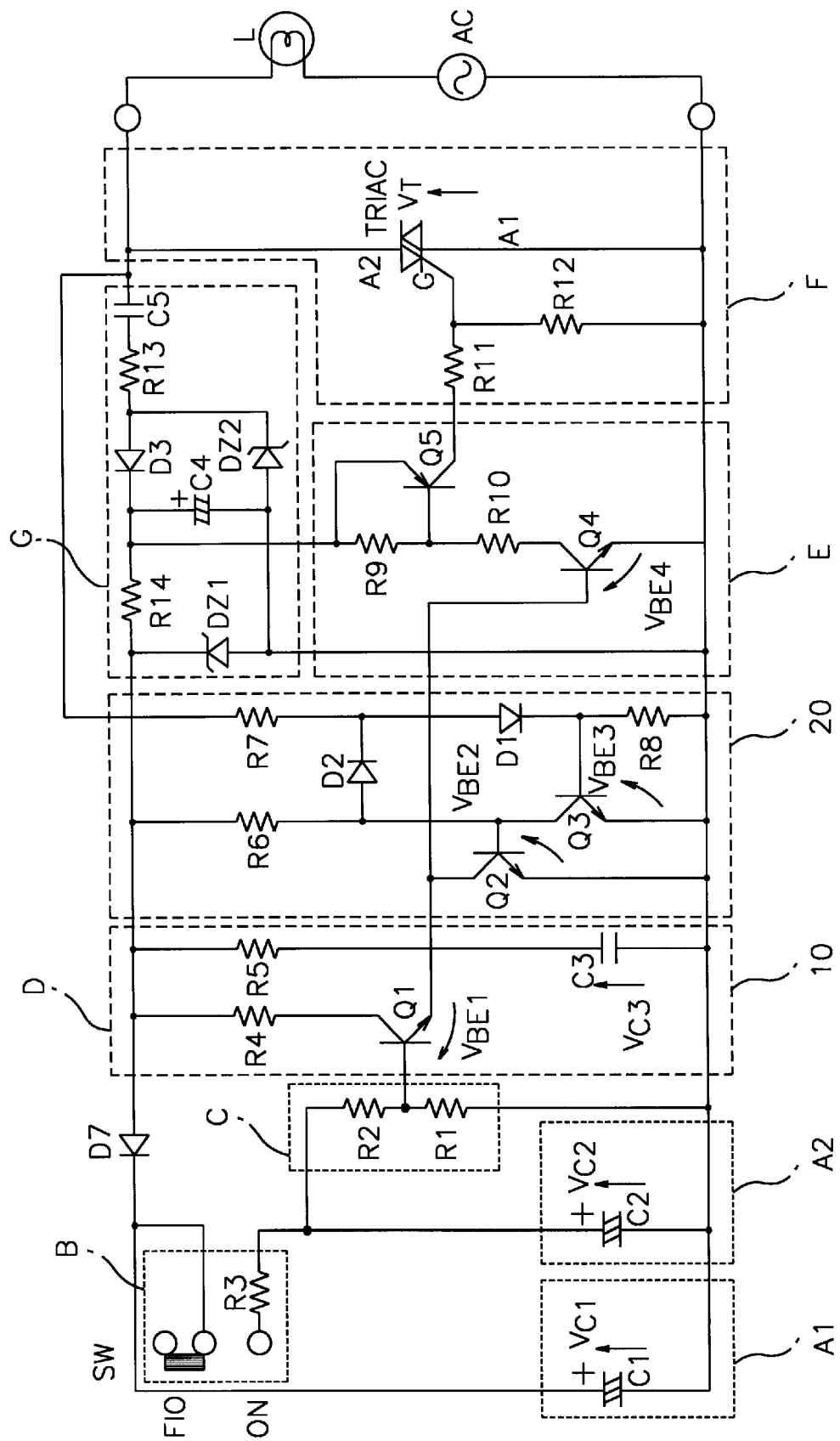
FIG. 4 is a view of showing a circuit according to another example of the block diagram depicted in FIG. 2.
Figure 5:
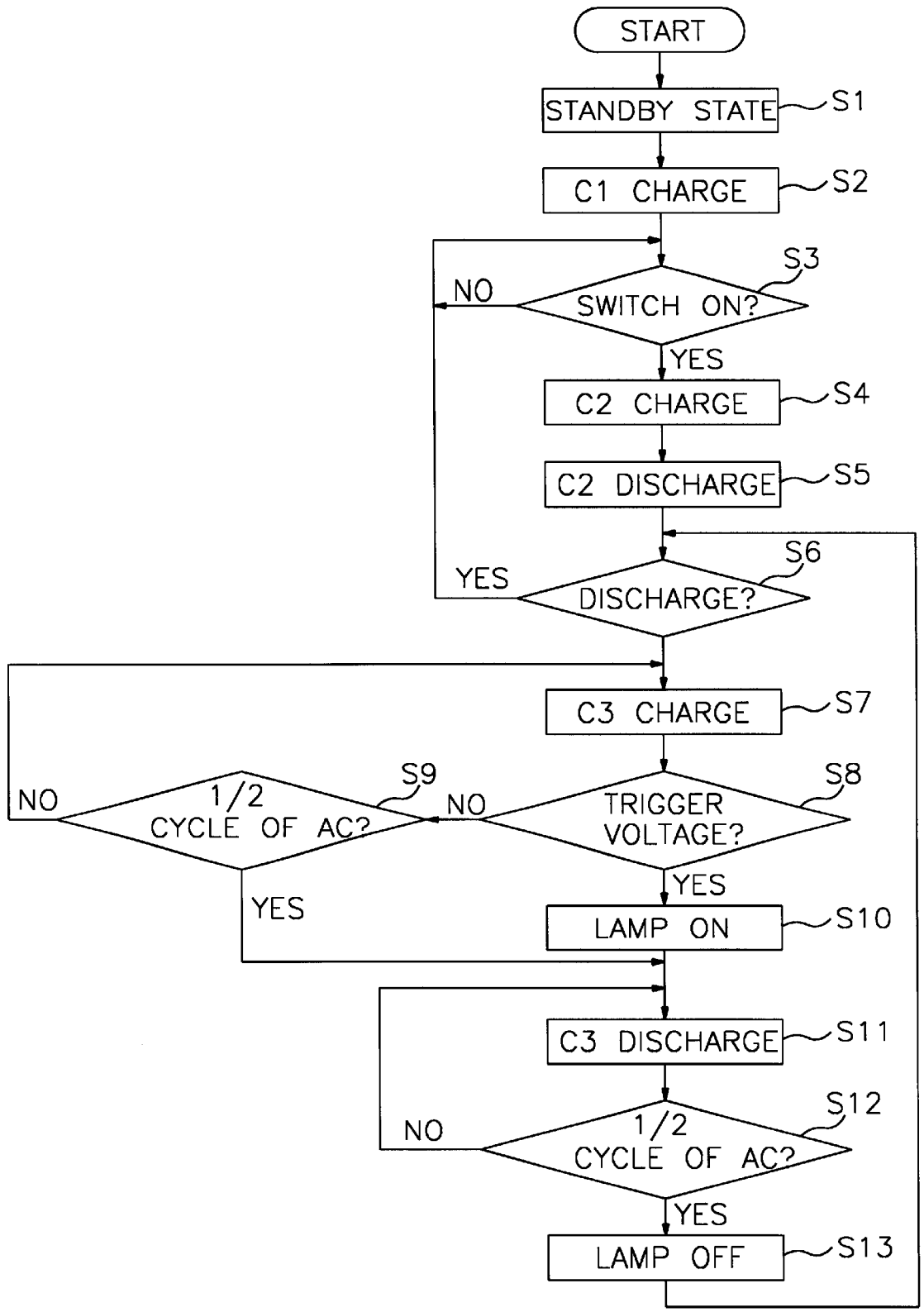
FIG. 5 is a flowchart for illustrating the operation of the present invention.

FIG. 2 is a block diagram for illustrating the functions of the present invention. FIGS. 3 and 4 are views showing a circuit of the block diagram depicted in FIG. 2. FIG. 5 is a flowchart for illustrating the operation of the present invention. FIG. 3 is a circuit in which a silicon controlled rectifier (hereinafter, referred to as SCR) is used as a switching device of a driving part. FIG. 4 is a circuit in which a triac is used as the switching device of the driving part.

Referring to FIG. 2, the switch circuit for fading out a supply of electric power includes the driving part F, a DC power source part G, a switch part B, a voltage dividing part C, a control part D, and a trigger signal generating part E.

The driving part F controls the supply of an AC source to a lamp L. The DC power source part G rectifies an AC voltage of the AC source to generate a DC voltage. The switch part B controls each electric charging of the first and second charging parts A1 and A2. The voltage dividing part C divides the discharging voltage of the second charging part A2. The control part D generates a control signal corresponding to a divided voltage from the voltage dividing part C. The trigger signal generating part E generates a trigger signal in response to the control signal.

The driving part F includes a diode bridge for full-rectifying the AC voltage from the AC source, the SCR, a diode D5, and a pull-down resistor R9. The anode and cathode of the SCR are connected with the output terminals of the diode bridge. The gate of the SCR is connected with the diode D5 and the pull-down resistor R9.

The DC power source part G includes a resistor R11 and a zener diode DZ1 for providing a regulated voltage to each part of the switch circuit. The control part includes an electric charging circuit 10 and an electric discharging circuit 20. The electric charging circuit 10 includes a transistor Q1, a capacitor C3, and two resistors R4 and R5. A charging time of the capacitor C3 is determined by the voltage from the voltage dividing part C and the DC power source G. The electric discharging circuit 20 includes two transistors Q2 and Q3 and a plurality of resistors R6 through R8 for discharging the electric charged energy of the capacitor C3 before charging the capacitor C3.

The trigger signal generating part G includes a resistor R10, a transistor Q4, and a diode D6. The trigger signal generating part G generates a trigger voltage according to the electric charged voltage of the electric charging circuit 10 and provides the trigger voltage to the gate of the SCR. The voltage dividing part C outputs a divided voltage according to the resistance ratio of the series resistors R1 and R2.

The first charging part A1 is a capacitor C1 for charging the voltage from the DC power source G, and the second charging part A2 is a capacitor C2 for charging the voltage from the DC power source G or the capacitor C1 of the first charging part A1 through the switch part B.

Hereinafter, the operation of the present invention will be described.

The diode bridge rectifies the AC voltage to generate a full rectified voltage. The full rectified voltage is provided to the zener diode DZ1 through the resistor R11 of the DC power source part G, such that the DC power source part G outputs the regulated voltage.

The resistance value of the circuit including the resistors R10 and R11 is greater than that of the lamp L, such that the lamp L is turned off. While the lamp L is turned off, the capacitor C1 of the first charging part A1 is charged by the DC voltage through the diode D7 (S1, S2).

When the switch part B is switched on, the capacitor C2 is charged by the DC voltage inputted through the switch part B (S3, S4). When the switch part B is switched off, the capacitor C2 starts to discharge the charged energy to the resistors R2 and R1 (S5).

That is, when the switch SW of the switch part B is switched on the ON terminal thereof, the lamp L is turned on. If a user wants to fade out the power consumption of the lamp L, the user causes the switch SW to be switched on the F/O terminal of the switch SW. While the switch is tuned on, the charging operation of the capacitor C2 is completed. As soon as the switch is turned off again, the capacitor C2 starts to discharge the charged energy to the resistors R1 and R2. When the discharging voltage of the capacitor C2 is greater than a predetermined voltage, the capacitor C3 of the first charging circuit 10 is superposition-charged (S6, S7).

Figure 6:
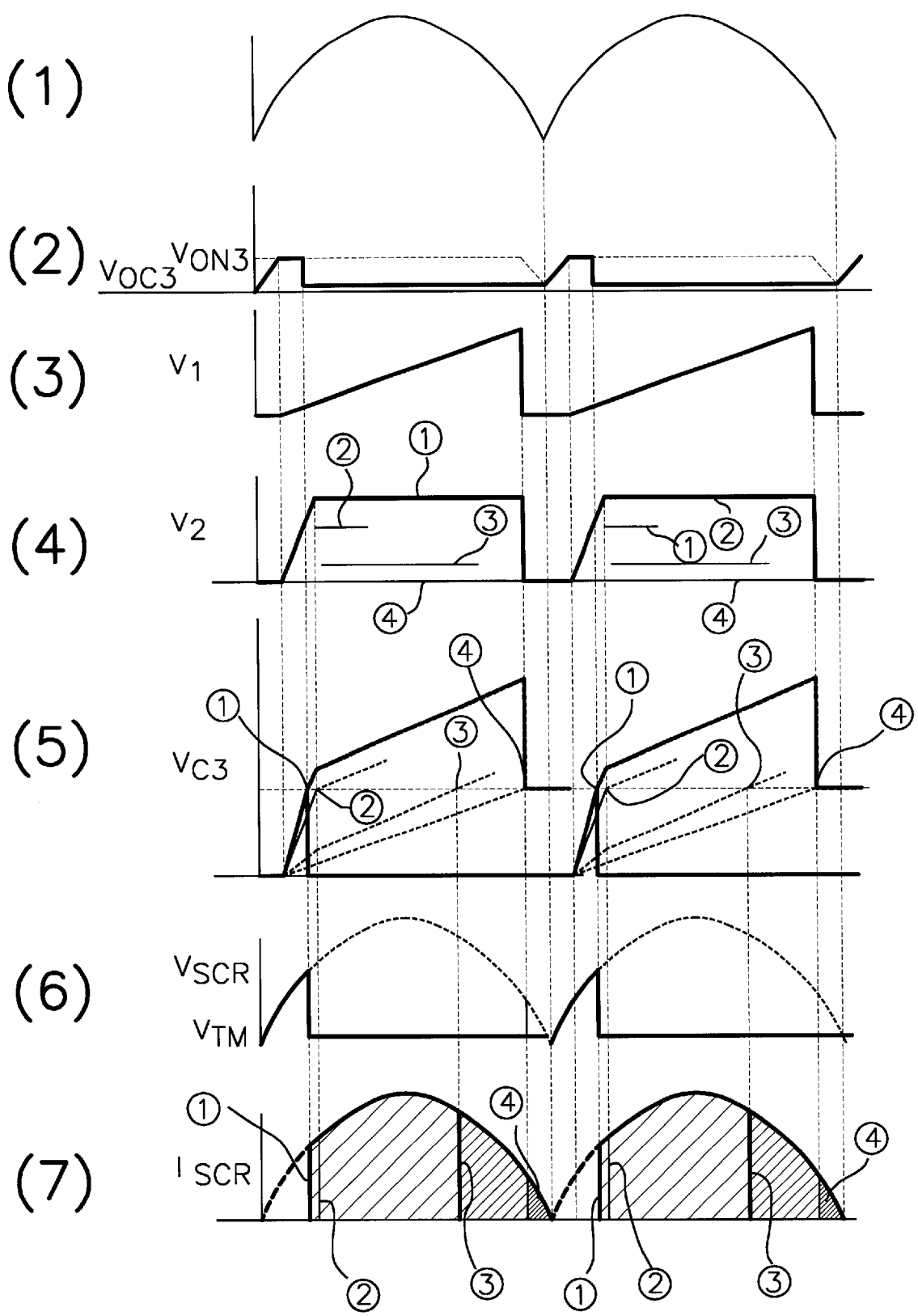
FIG. 6 is a waveform for illustrating the circuit depicted in FIG. 3.

The base voltage of the transistor Q3 starts to increase passing to the zero point of transfer rectified signal, as shown in (2) of FIG. 6. When the base voltage of transistor Q3 is less than the turn-on voltage $V_{ON3}$, the collector of the transistor is open. However, since a voltage of $(R7+R8)/R8$ times as much as the base voltage of the transistor Q3 is inputted to the base of the transistor Q2 through resistor R6, the transistor Q2 is turned on faster than the transistor Q3, such that the capacitor C3 is first discharged before being charged.

As the base voltage $V_{BE3}$ of the transistor Q3 is increased, the base voltage $V_{BE3}$ of the transistor Q3 reaches at the turn-on voltage $V_{ON3}$, such that the transistor Q3 is turned on. When the transistor is turned on, the base voltage of the transistor Q2 drops down to a low level, such that the transistor Q2 is turned off and the capacitor C3 starts to be charged.

When the transistor Q1 is turned on by the voltage, $V_{C2} \times R1/(R1+R2)$, applied to the base thereof, the capacitor C3 is charged by a current from the emitter of the transistor Q1.

The charging voltage of the capacitor C3 charged by the current of the transistor Q1 is referred to as V2. The voltage V2 abruptly increases during charging, and has a constant value after the charging operation is completed, as shown in (4) of FIG. 6.

At the same time, the regulated voltage from the DC power source part G is applied to the capacitor C3 through the resistor R5. The charging voltage V1 charged to the capacitor C3 via the resistor R5 has a saw-tooth wave form as shown in (3) of FIG. 6. The velocity difference of charging the capacitor C3 by the voltages V1 and V2 is adjustable by decreasing the resistance ratio of the resistors R4 and R5. When the resistance value of the resistor R4 varies, the voltage V2 varies. Therefore, the trigger starting point of the SCR can be vary.

By adjusting the time constant of the capacitor C3 and resistor R5, the voltage V1 is less than each of the turn-on voltage $V_{BE4}$ between the base and emitter of the transistor Q4, the turn on voltage of the diode D5, and the trigger voltage of the gate of the SCR, thereby preventing the SCR from being triggered by the maximum value of the voltage V1. That is, the voltage V1 is as follows:

$$V1_{max} < (V_{BEA} + V_{DS} + V_{GT})$$

Therefore, the charging voltage of the capacitor C3 is V1+V2, and the capacitor C3 is superposition-charged by the voltages V1 and V2.

In step 8, whether the charging voltage of the capacitor C3 is sufficient to trigger the SCR after the capacitor C is charged fully (S8) is determined.

When the charging voltage of capacitor C3 is less than the trigger voltage of the SCR, in step 9, it is determined whether the half cycle of AC voltage is passed or not (ST9).

During the half cycle of the AC voltage, the capacitor C3 is continuously charged. As soon as the charging operation of the capacitor C3 is completed, the capacitor C3 starts to discharge the charged energy (S11).

When the charging voltage of the capacitor C3 is greater than the trigger voltage, the SCR is turned on, such that the lamp L is turned on. That is, the charging voltage of the capacitor C3 is applied to the base of the transistor Q4 of the trigger signal generation part E, such that the gate voltage of the SCR declines to a pull-up voltage, such that the SCR is triggered by the pull-up voltage applied to the gate thereof. The lamp L is turned on for the half cycle of AC voltage (S10). This operation is depicted in (5) of FIG. 6.

For example, when a great voltage is applied from the voltage dividing part C to the base of the transistor Q1, one charging voltage V2 of the capacitor C3 has a wave form 1 depicted in (4) of FIG. 6. Therefore, the charging voltage of the capacitor C3 is the voltage V1+V2, depicted with a dotted line in (5) of FIG. 6.

The points 1, 2, 3, and 4, depicted in (5) of FIG. 6 indicate the trigger time points of the SCR with the charging time. In the time point 1, the SCR is turned on. The voltage between the anode and cathode of the SCR declines to the turn-on voltage of the SCR, as shown in (6) of FIG. 6. Therefore, the AC voltage is inputted from time point 1 of half cycle of AC voltage to lamp L, as shown in (7) of FIG. 6.

When the SCR is turned on, the capacitor C3 discharges the charged voltage to the resistors R5, R7, and R8. As the capacitor discharges the charged voltage, the base voltage of the transistor Q3 declines to be turned off.

When the transistor Q3 is turned off, the turn-on voltage of the SCR is applied to the base of the transistor Q2, such that the transistor Q2 is turned on. Therefore, the capacitor C3 is discharged abruptly through the transistor Q2, and the transistor Q4 is turned off. The gate voltage of the SCR declines to zero voltage, but the SCR remains on.

When the half cycle of AC voltage passes, that is, the zero crossing point of AC voltage is inputted to the SCR, the SCR is turned off by the zero voltage of the AC voltage, such that the power supply to the lamp L is stopped (S11, S12, S13).

After the lamp L is turned off, the steps 6 through 13 are repeated again until the discharging voltage of the capacitor C2 drops down to the turn-off voltage of the transistor Q1.

Further, the trigger point of the SCR is gradually delayed, such that the power being supplied to the lamp L fades out, as shown in (7) of FIG. 6.

The time period for fading out the lamp L is determined by the time constant of the second charging part A2, as shown in (5) of FIG. 6. Therefore, if a variable resistor VR1 which is substituted for the resistor R1 varies, the time period for fading out the lamp can vary by varying the resistance value of the variable resistor VR1.

The operation of fading out the brightness of the lamp will be described with reference to (4), (5), and (7) of FIG. 6.

As the capacitor C2 is discharged, the discharging voltage $V_{C2}$ of the capacitor C2 decreases with time. The discharging voltage $V_{C2}$ of the capacitor C2 is provided to the base of the transistor Q1 through the voltage dividing part C. The charging voltage V2 which is applied from the transistor Q1 to the capacitor C3 varies from 1 to 2 as shown in (4) of FIG. 6. Since the voltages V1 and V2 are superposed on the capacitor C2, the charging voltage of the capacitor C2 decreases as shown in (5) of FIG. 6.

As the charging voltage of the capacitor C3 gradually decreases, the trigger point of the SCR is shifted from 1 to 4. This shifting operation of the trigger point reduces the duty cycle of AC voltage applied to the lamp L, such that the lighting time of the lamp is gradually decreased. As the lighting time of the lamp is reduced, the brightness of the lamp L is reduced, too. Therefore, the brightness of the lamp L fades out during the time constant of the capacitor C2.

According to another embodiment depicted in FIG. 4, the first anode A1 and the second anode of the triac of the driving part F are respectively connected with both output terminals of AC power source, and the gate of the triac is connected with the resistors R11 and R12.

The control part D includes the same charging circuit 10 as that of FIG. 3 and the discharging circuit 20 including transistors Q2 and Q3, diodes D1 and D2, and a plurality of resistors R6 through R8. The trigger signal generating part E includes two resistors R9 and R10 and two transistors Q4 and Q5 for providing a trigger signal to the gate of the triac according to the charged voltage of the charging circuit 10.

The switch part B and the voltage dividing part C are the same as those of FIG. 3. The DC power source part G rectifies AC voltage from the AC power source and regulates a half-rectified voltage. The DC power source part G includes two resistors R13 and R14, a capacitor C4, and two zener diodes DZ1 and DZ2.

Hereinafter, the operation of the circuit depicted in FIG. 4 will be described with reference to the flowchart depicted FIG. 5.

By steps 1 and 2, the capacitor C1 is charged. The AC voltage of the AC power source is half-rectified by the resistor R13, the capacitor C5, the diode D3, and the zener diode DZ2. The half-rectified voltage applied to the capacitor C4 is regulated by the resistor R14 and the zener diode DZ1. Since the impedance of the capacitor C5 and the resistor R13 is much greater than that of the lamp L, the lamp L is turned off when the triac is not triggered.

The capacitor C1 of the first charging part A1 is charged with the regulated voltage. After the steps 3 through 7 in turn occur, as illustrated in FIG. 3, the base voltage of the transistor Q3 increases by passing the positive zero crossing point of AC voltage, as shown in (1) of FIG. 7. The transistor Q3 is not turned on until the base voltage of the transistor Q3 attains the turn-on voltage $V_{ON3}$. Therefore, the transistor Q2 is turned on, as shown in (2) of FIG. 7, such that the capacitor C3 is discharged.

Figure 7:
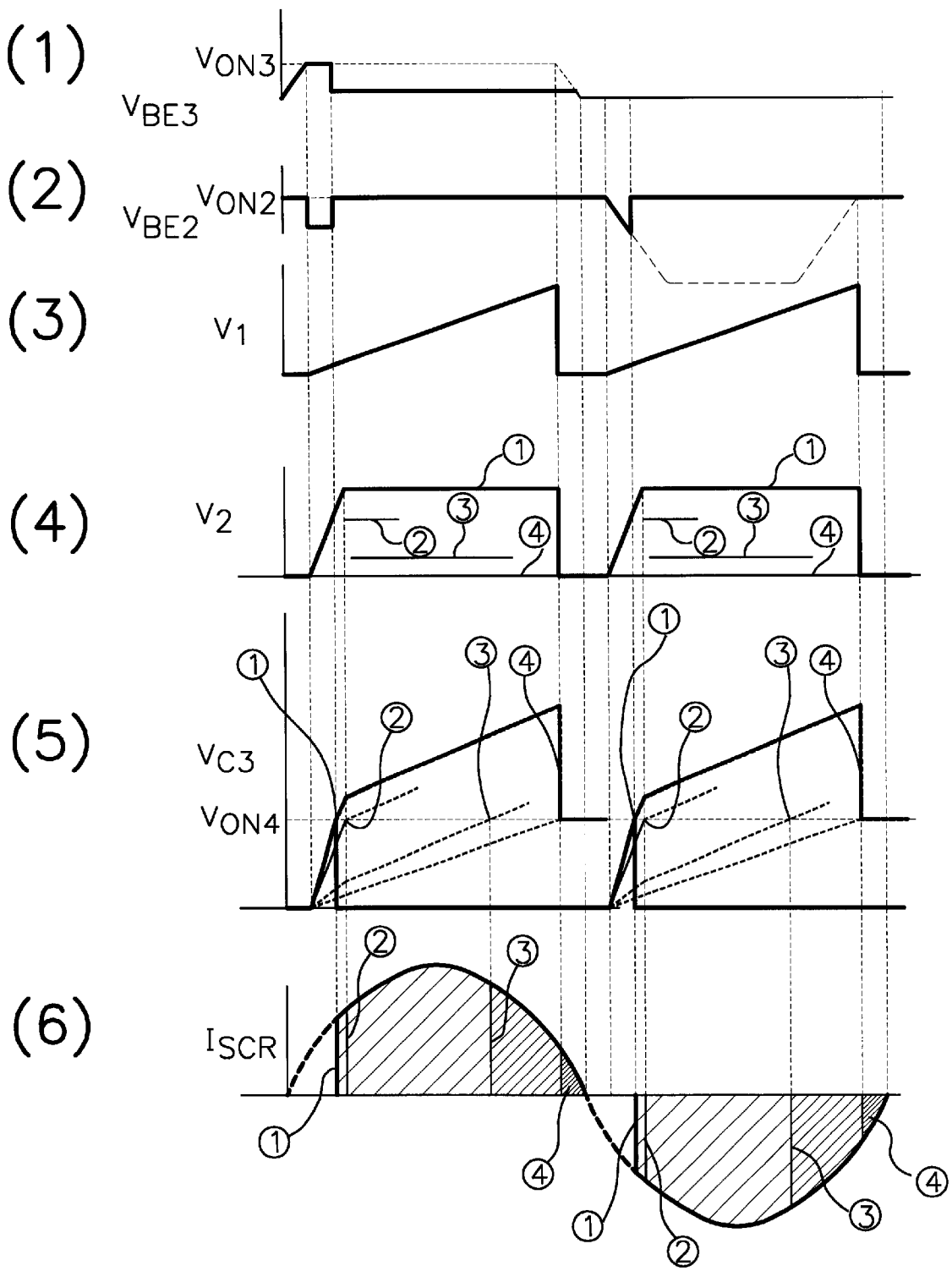
FIG. 7 is a waveform for illustrating the circuit depicted in FIG. 4.

When the base voltage of the transistor Q3 attains the turn-on voltage $V_{ON3}$, the transistor Q3 is turned on as shown in (1) of FIG. 7. when the base voltage of the transistor Q2 is a low level, as shown in (2) of FIG. 7, the transistor Q2 is turned off, such that the capacitor C3 is charged.

The charged voltage of the capacitor C2 is applied to the base of the transistor Q1 through the resistors R1 and R2. The transistor Q1 is turned on by the base voltage thereof, $V_{C2} \times R1/(R1+R2)$. At the same time, the capacitor C3 is charged by a current outputted from the emitter of the transistor Q1.

When the charged voltage of the capacitor C3 is referred to as V2, the charged voltage V2 has a waveform of an initial slant and a constant voltage level.

At the same time, the regulated voltage of the DC power source part G is also applied to the capacitor C3 through the resistor R5. The voltage V1 charged in the capacitor C3 by the regulated voltage has a saw-tooth waveform, as shown in (3) of FIG. 7. the difference of charging velocity between the voltages V1 and V2 is proportional to the resistance ratio of the resistors R4 and R5. When the capacitor C3 is discharged fully, the time constant of the capacitor C3 and the resistor R3 is adjusted to prevent the triac from being triggered. That is, the maximum voltage of the capacitor C3 which is charged during the one cycle of the AC voltage is less than the turned-on voltage $V_{ON4}$ of the transistor Q4. The maximum voltage V1max of the capacitor C3 is as follows:

$$V1max < V_{ON4}.$$

Therefore, the charging voltage VC3 of the capacitor C3 is V1+V2. That is, the voltages V1 and V2 are superposed on the capacitor C3.

The capacitor C3 is charged during one half cycle of AC voltage, but during the other half cycle of AC voltage, the capacitor C3 is discharged (S11). When the charged voltage of the capacitor C3 attains the turned-on voltage $V_{ON4}$, the transistor Q4 of the trigger signal generating part E is turned on and the charged current of the capacitor C3 is provided to the gate of the triac, such that the triac is triggered (S8). Once the lamp L is turned on, the lamp L maintains in the turned-on state (S10), as shown in (5) of FIG. 7.

When a high voltage is applied from the voltage dividing part C to the base of the transistor Q4, the charged voltage V2 of the capacitor C3 has a waveform 1 depicted in (4) of FIG. 7. Therefore, the voltage V1+V2 applied to the capacitor has a waveform indicated by a dotted line in (5) of FIG. 7. The dotted line from 1 to 2 indicates the trigger level of the triac. When the triac is turned on at the time point 1, the AC voltage is applied to the lamp L from the time point 1 to the zero crossing point of the AC voltage, as shown in (6) of FIG. 7.

When the triac is turned on, the capacitor C3 starts discharging (S11). As the capacitor discharges the charged voltage, the base voltage $V_{BE3}$ of the transistor Q3 declines to be turned off and the transistor Q2 is turned on.

When the transistor Q2 is turned on, the capacitor C3 is discharged abruptly through the transistor Q2, and the transistor Q4 is turned off. The gate voltage of the triac drops down to the zero voltage, but the triac remains turned on.

When the half cycle of AC voltage passes, that is, the zero crossing point of AC voltage is inputted to the triac, the triac is turned off by the zero voltage of the AC voltage, such that the power supply to the lamp L is stopped (S11, S12, S13).

After the lamp L is turned off, steps 6 through 13 are repeated again until the discharging voltage of the capacitor C2 declines the turn-off voltage of the transistor Q1.

Since the operation of the circuit depicted in FIG. 4 for the positive half cycle of AC voltage is the same as that of FIG. 3, the detailed illustration of the operation of the circuit for the positive half cycle is omitted, and the operation for the other half cycle will be illustrated below.

During the negative half cycle of the AC voltage, since the base voltage $V_{BE3}$ of the transistor Q3 is zero as shown in (1) of FIG. 7, the transistor Q3 is turned off and the transistor Q2 is turned on. The negative voltage during the negative half cycle is applied to the base of the transistor Q2, such the base voltage $V_{BE2}$ of the transistor Q2 is varied as indicated by the dotted line in (2) of FIG. 7.

As the negative voltage of the AC voltage is increased, the base voltage $V_{BE2}$ of the transistor Q2 is varied. The transistor Q2 is not turned on until the base voltage $V_{BE2}$ of the transistor Q2 declines the turned-on voltage $V_{ON2}$. When the transistor Q2 is turned off, the voltages V1 and V2 are superposed upon the capacitor C3, such that the charged voltage of the capacitor C3 is increased to the turned-on voltage $V_{ON4}$ of the transistor Q4. When the transistor Q4 is turned on, the triac is turned on too. The base voltage $V_{BE2}$ of the transistor Q2 is increased to the turned-on voltage of the transistor Q2, such that the capacitor C3 discharges the charged energy thereof. Therefore, during the negative half cycle of the AC voltage, the transistor Q3 is turned on and the turned-off state of the transistor Q2 maintains as shown in (2) of FIG. 7.

As the anode voltage of the triac approximately reaches the zero crossing point, the capacitor C3 discharges the energy charged therein, and the triac is disabled. When the anode voltage of the triac is zero, the triac is turned off. Those operations are repeated every cycle of the AC voltage while the discharging of the capacitor C2 is completed. The time points on each of which the triac is triggered are varied with time. Each of the time points for triggering the triac is determined by the discharging voltage $V_{C2}$ of the capacitor C2. The reference numerals 1 through 4 of FIG. 7 indicate the variation of the discharging voltage $V_{C2}$ of the capacitor C2. The time constant of the capacitor C2 can be varied by substituting a variable resistor for the resistor R1.

As the discharging voltage $V_{C2}$ of the capacitor C2 is decreased, the turned-on time of the triac is delayed. Therefore, the brightness of the lamp L fades out.

The discharging voltage $V_{C2}$ of the capacitor C2 is decreased with time. The discharging voltage $V_{C2}$ of the capacitor C2 is provided to the base of the transistor Q1 through the voltage dividing part C. The charging voltage V2 which is applied from the transistor Q1 to the capacitor C3 is varied from 1 to 4 as shown in (4) of FIG. 7. Since the voltages V1 and V2 are superposed on the capacitor C3, the charging voltage of the capacitor C3 is decreased as shown in (5) of FIG. 7.

As the discharging voltage of the capacitor C2 is gradually decreased, the trigger point of the triac is shifted from ? to ?. This shifting operation of the trigger point reduces the duty of AC voltage applied to the lamp L, such that the lighting time period of the lamp is gradually decreased. As the lighting time period of the lamp is reduced, the brightness of the lamp L is reduced too. Therefore, the brightness of the lamp L fades out during the time constant of the capacitor C2.

Figure 8A:
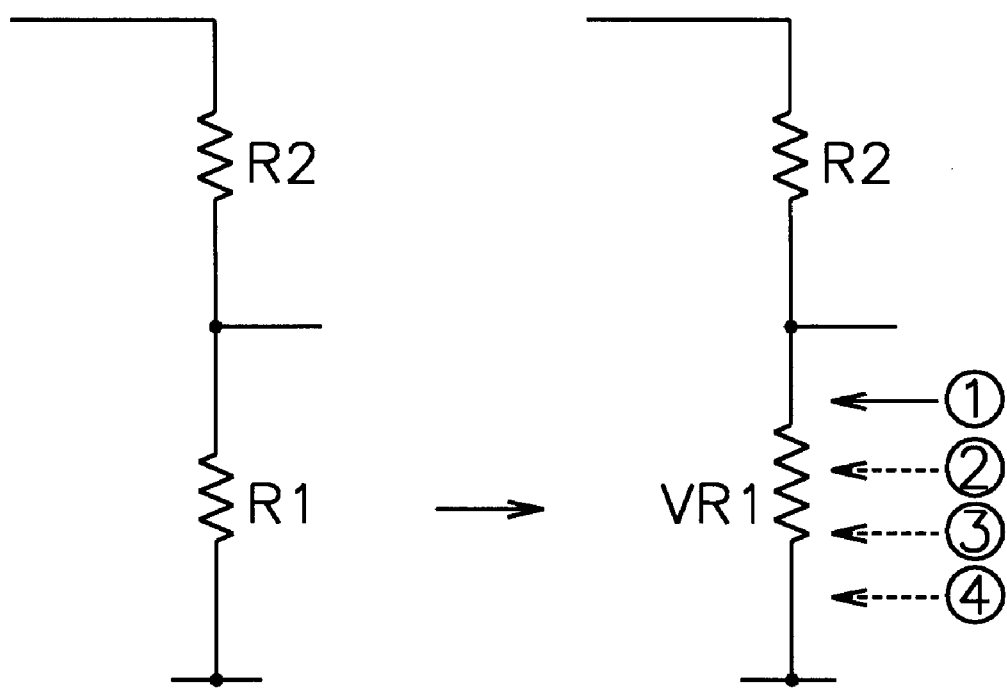
FIG. 8A is a view for showing a circuit according to one example of the voltage dividing part.

Further, when the resistor R1 is substituted with the variable resistor VR1 as shown in FIG. 8A, the brightness of the lamp L is variable as shown in FIG. 8B.

When the turn-off of the lamp L is not needed, incomplete turn-off is achieved by the charging circuit 10. If the resistance value of the resistor R5 is reduced, the charging voltage of the capacitor C3 through the resistor R5 shown in FIG. 3B is increased, such that the lamp L is not turned off. That is, although the transistor Q1 is turned off, the capacitor C3 is sufficiently charged only by the current flowing from the resistor R5. Therefore, the lamp L remains turned-on, and the brightness of the lamp L is determined by the resistance value of the resistor R5.

Hereinafter, the maintaining operation of the turned-on the lamp L will be described with reference to FIGS. 9A and 9B.

Figure 9B:
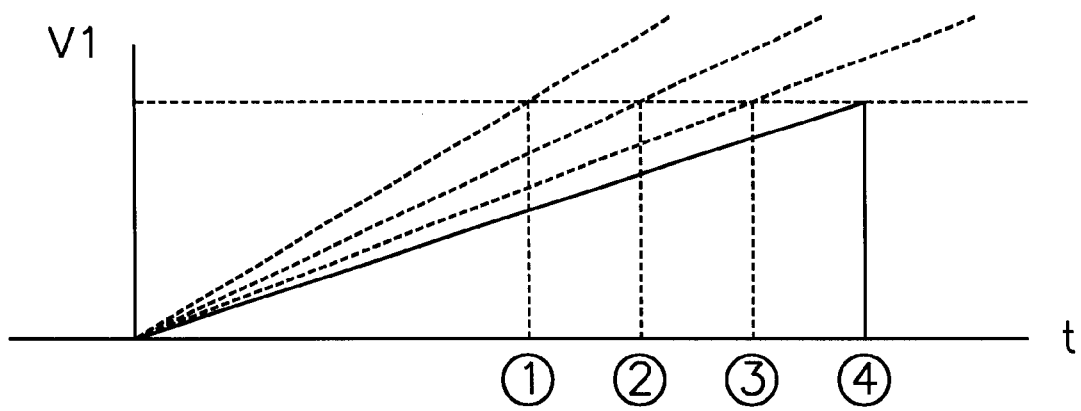
FIG. 9B is a wave form view for illustrating the circuit of the FIG. 9A.
Figure 9B:
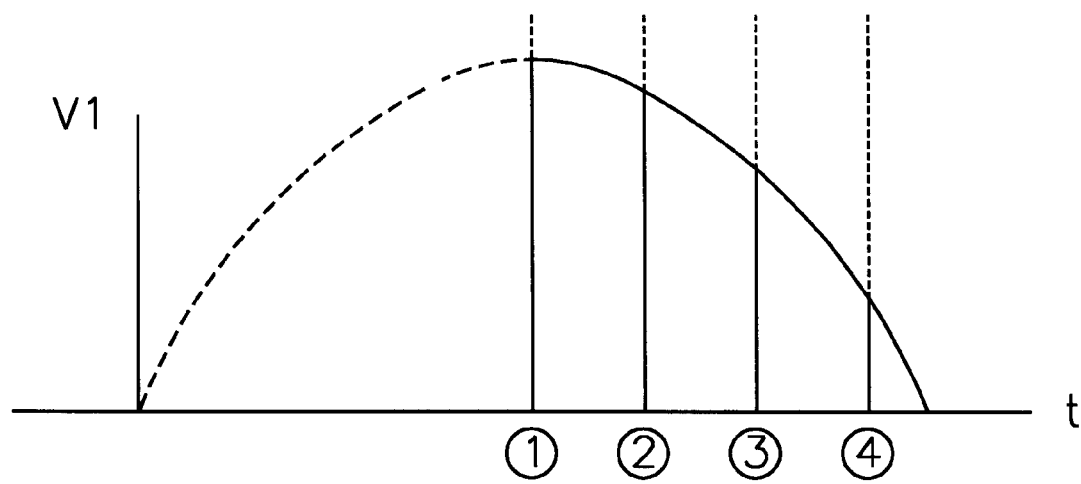

FIG. 9A is a view for showing one exemplary circuit with which the resistor R5 can be substituted. FIG. 9B is a view of showing an output voltage VR2 of the circuit depicted in FIG. 9A. The circuit includes a variable resistor VR2 and a resistor R0 in series. As illustrated above, the SCR is not triggered at the maximum value of the complex resistance of the variable resistor VR2 and resistor R0. The resistance value of the resistor R0 is set to be able to cause the lamp to light with a predetermined brightness. Therefore, when the variable resistor has the minimum resistance value, the lamp L maintains the lighting state. If a user would like to control the lamp L to be either turned on or off, the turned-on/off control of the lamp L can be achieved by causing the resistance of the variable resistor VR2 to be the minimum value. When the resistance of the variable resistor VR2 is the minimum value, the current flowing through the variable resistor VR2 is maximum, such that the trigger point of the SCR approximates the zero crossing point of AC voltage, as indicated by 1 in (1) of FIG. 9B. Therefore, since the SCR is turned on at the time point 1, as shown in (2) of FIG. 9B, the brightness of the lamp L is fixed. When the discharging voltage $V_{C2}$ of the capacitor C2 is zero, the brightness of the lamp L is controlled by the variable resistor VR2. When the resistance value of the variable resistor VR2 is increased by the increase of the time constant of the capacitor C3, the charging time of the capacitor C3 is delayed such that the trigger time point of the SCR is delayed, as shown in (1) FIG. 9B. When the trigger time point of the SCR is delayed, the duty time of the AC voltage applied to the lamp L is reduced, such that the brightness of the lamp L is reduced as much as the turned-on time point of the SCR is delayed. Therefore, when the resistance value of the variable resistor VR2 is gradually reduced, the trigger point of the SCR is shifted from 1 to 4, as shown in (1) and (2) of FIG. 9B, such that the brightness of the lamp L is decreased in proportion to the increase of the resistance value of the variable resistor VR2. That is, when the resistance value of the variable resistor VR2 is maximum, the current flowing through the variable resistor VR2 is minimum.

When the current of the variable resistor VR2 has the minimum value, the SCR is not triggered. Further, when the resistance value of the resistor R3 is increased, the charging velocity of the capacitor C2 is decreased, such that the brightness of the lamp L does not fade out but fades in. Since the fade-out time is controlled by varying each value of the capacitor C2, the resistor R3, and the voltage $V_{C1}$, the circuit according to the present invention performs the same functions as those of a conventional timer.

Figure 10:
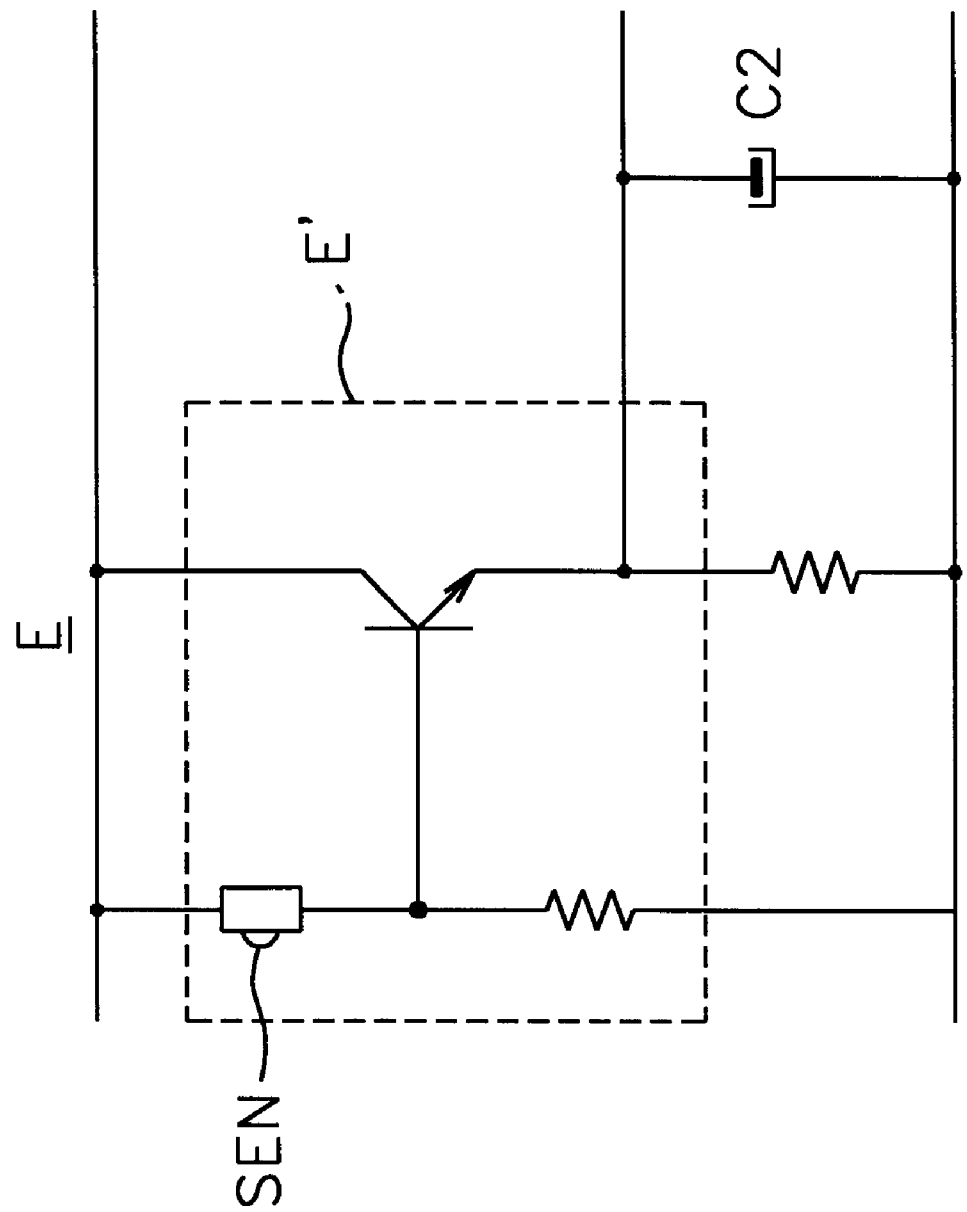
FIG. 10 is a view for showing an example of the switching part.

As shown in FIG. 10, the switch SW of the switch part B is substituted with a sensor for sensing the human body. When the sensor SEN senses the human body, by the switching operation of the sensor SEN the capacitor C2 is charged. The sensor SEN for sensing the human body may be replaced with a supersonic sensor, a thermal sensor, an infrared sensor or the like.

Figure 11:
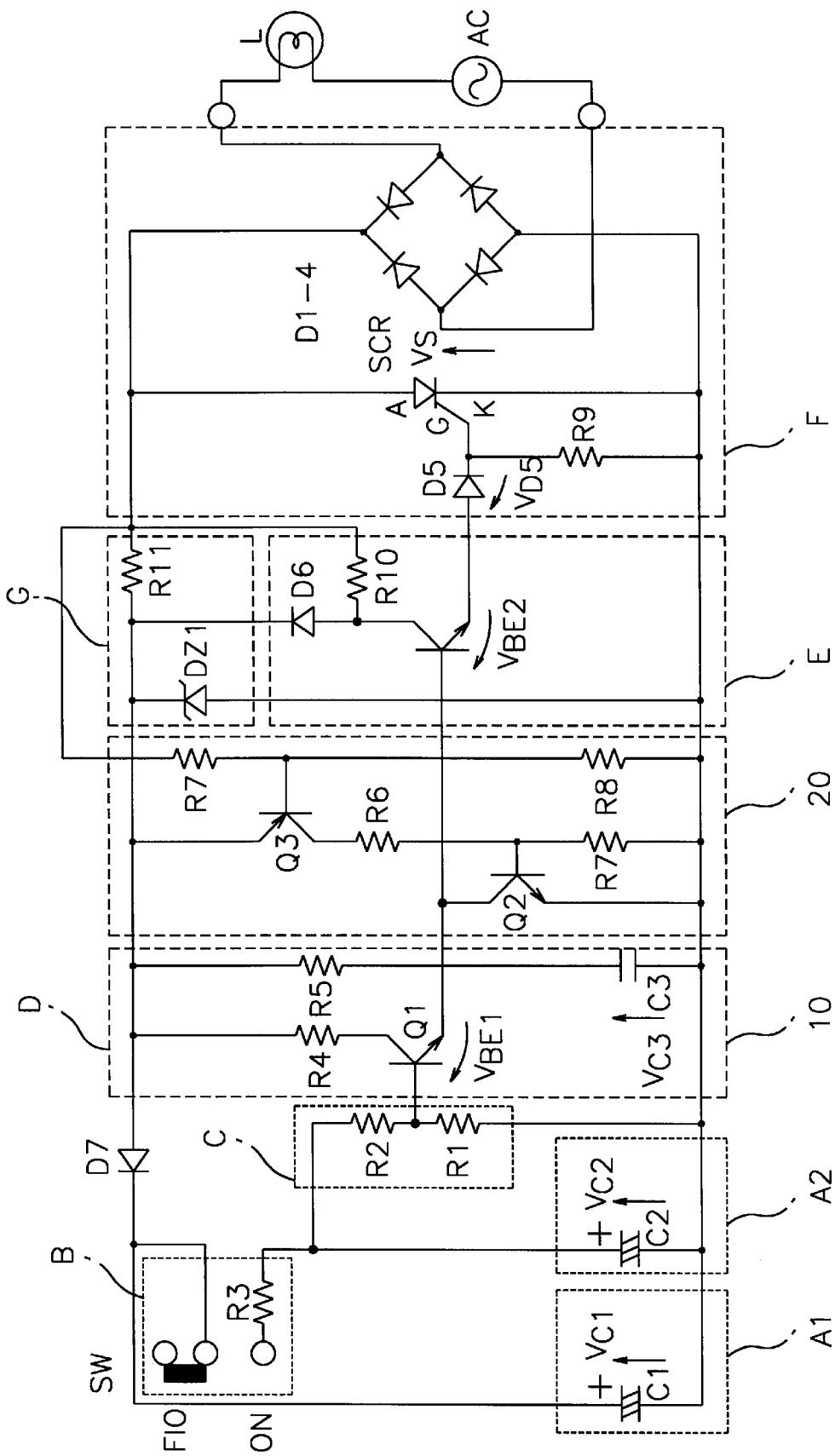
FIGS. 11 through 13 are views for showing various embodiments of the present invention.
Figure 12:
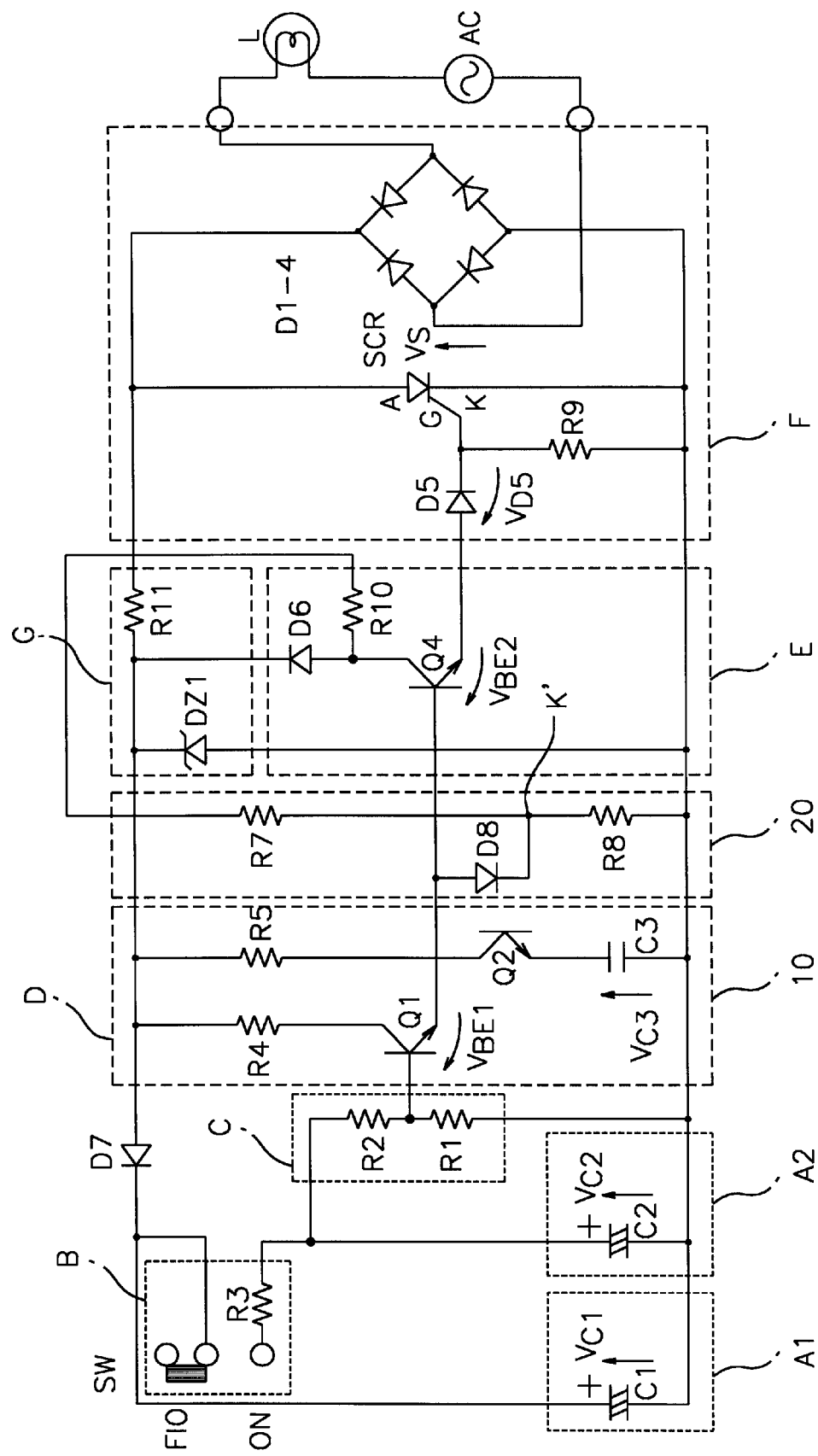
Figure 13:
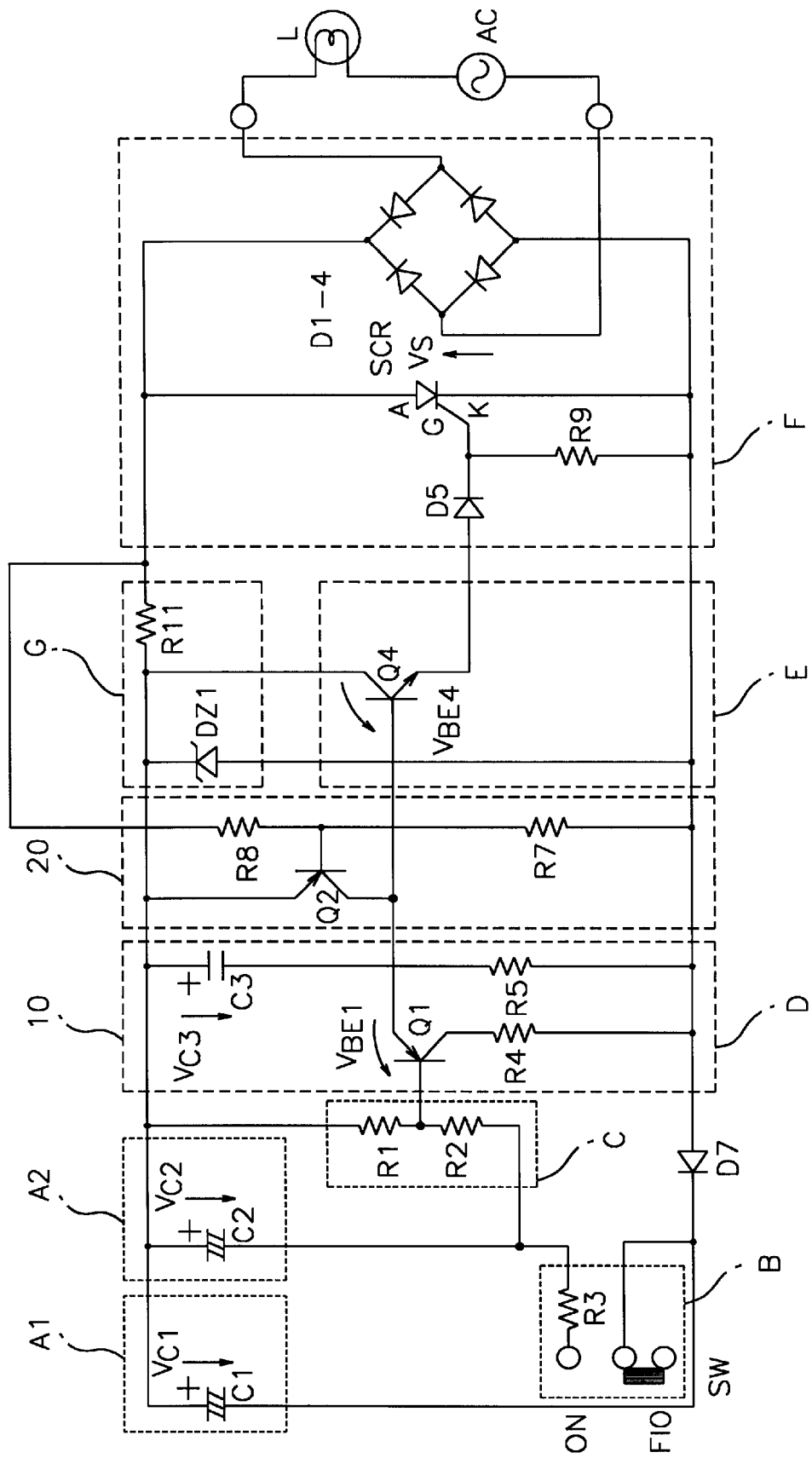

FIGS. 11 through 13 are views for showing various examples of the discharging circuit 20. The circuits depicted in FIGS. 11 through 13 perform the same functions as those of FIGS. 3 and 4.

Referring to FIG. 11, the emitter of transistor Q3 is connected with the output terminal of the DC power source part G. The collector of the transistor Q3 is connected with one terminal of the resistor R6, and the other terminal of the resistor R6 is connected with the base of the transistor Q2. One terminal of the resistor R6' is connected with the base of the transistor Q2 and the other terminal of the resistor R6' is connected with the emitter of the transistor Q2. The base of the transistor Q3 is connected with the anode of the SCR through the resistor R7.

When the base voltage of the transistor Q3 is lower than the emitter voltage of the transistor Q3, the transistor Q3 is turned on, such that the transistor Q2 is also turned on. When the transistor Q2 is turned on, the capacitor C3 discharges the charged energy through the transistor Q2. As the regulated voltage from the DC power source part G is increased, the transistor Q3 is turned off. While the transistor is turned off, the capacitor C3 is charged.

Referring to FIG. 12, the discharging circuit 20 includes a diode D8 and two resistors R7 and R8. The anode of the diode D8 is connected with the emitter of the transistor Q1 and the base of the transistor Q4, respectively. The cathode of the diode D8 is connected with a connecting node k of the resistors R7 and R8.

According to the circuit depicted in FIG. 12, when the AC voltage reaches the zero crossing point, the voltage of the node k is zero, such that the capacitor C3 discharges the charged energy through the diode D8 and the resistor R8. When the voltage of the node k is higher than the maximum charged voltage of the capacitor C3, the capacitor C3 is charged.

The operation of the circuit depicted in FIG. 13 is the same as that of FIG. 3 except that the types of transistors Q1, Q2, and Q4 are changed into the PNP type.

In FIG. 13, the resistance values of the resistors R7 and R8 are set to cause the base voltage of the transistor Q2 to be higher than the rectified voltage from the DC power source part. The transistor Q2 is not turned off until the rectified voltage is lower than a voltage set by the resistors R7 and R8. Therefore, the capacitor C3 is charged while the transistor is turned off.

The circuit according to the present invention may be used in a place such as a passage way, an entrance, or the like. Further, the circuit is used for brightening indoors with a constant intensity of illumination. Further, the circuit fades out the brightness of the lamp after the lamp is turned on.

According to the present invention, a push button is provided as a method of controlling electric power, and a circuit is provided which can fade out electric power being supplied to an electric load.

While this invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method of controlling electric power of an electric load, the method comprising the steps of:
   a) generating a control voltage which decreases over time;
   b) accumulating a charge from the control voltage upon a voltage signal increasing over time and discharging an accumulated charge nearby a zero crossing point of AC voltage from the AC source in order to generate a saw-tooth wave;
   c) generating trigger signals based on the saw-tooth wave, wherein the phase angle of the trigger signals varies depending on the saw-tooth wave; and
   d) supplying electric energy from the AC power source to the electric load in response to the trigger signals.

2. A circuit for fading out electric power of an electric load, the circuit comprising:
   means for generating a control voltage which decreases over time;
   means for accumulating a charge from the control voltage upon a voltage signal increasing over time and for discharging an accumulated charge nearby a zero crossing point of AC voltage from the AC source in order to generate a saw-tooth wave;
   means for generating trigger signals based on the saw-tooth wave, wherein the phase angle of the trigger signals varies depending on the saw-tooth wave; and
   means for supplying electric energy from the AC power source to the electric load in response to the trigger signals.

3. A circuit as claimed in claim 2, further comprising means for rectifying an AC voltage from the AC power source,
   wherein the control voltage generating means includes a first capacitor for charging a DC voltage from the rectifying means and discharging charged energy to a first resistor in response to the driving signal;
   the first resistor having one terminal which is connected with a discharging terminal of the first capacitor; and
   a second resistor having one terminal which is connected with the other terminal of the first resistor and the other terminal which is grounded,
   wherein the control voltage is generated from a connecting node of the first and second resistors.

4. A circuit as claimed in claim 3, wherein the second resistor is a variable resistor.

5. A circuit as claimed in claim 2, further comprising means for rectifying an AC voltage from the AC power source to generate the voltage signal,
   wherein said accumulating means includes a charging circuit for accumulating a charge from the control voltage upon the voltage signal; and
   a discharging circuit for discharging the an accumulated charge voltage in response to the zero crossing point of the AC voltage.

6. A circuit as claimed in claim 2, wherein said trigger signal generating means includes means for generating the saw-tooth signal based on the control voltage in response to the zero crossing points, wherein a rise time of each saw-tooth signals is dependent on the control voltage; and
   means for generating the trigger signals in response to each voltage of the saw-tooth signals.

7. A circuit as claimed in claim 6, wherein said saw-tooth signal generating means includes means for rectifying the AC current from the AC power source;
   means for storing electric energy from the rectifying means according to the control voltage in order to generate a charging voltage; and
   means for discharging electric energy stored by the storing means in response to the zero crossing point.

8. A circuit as claimed in claim 7, wherein said storing means includes a first transistor for generating a first charging current corresponding to the control voltage;
   a second capacitor for storing the first charging current and a second charging current, thereby outputting the charging voltage;
   a third resistor for biasing the first transistor; and
   a fourth resistor for generating the second charging current, one terminal of which is connected to an output terminal of the rectifying means and the other terminal of which is connected with a positive terminal of the second capacitor.

9. A circuit as claimed in claim 8, wherein the fourth resistor is a variable resistor.

10. A circuit as claimed in claim 7, wherein said discharging means includes:
    a second transistor for discharging the electric energy stored by the storing means according to a voltage which is inputted to a base of the second transistor;
    a third transistor for driving the second transistor by controlling the base voltage of the second transistor according to a voltage of a base of the third transistor;
    a fifth resistor having one terminal which is connected with the second transistor and the other terminal which is connected with an output terminal of the rectifying means;
    a sixth resistor having one terminal which is connected with the output terminal of the rectifying means of the third transistor and the other terminal which is connected with the base of the third transistor; and
    a seventh resistor having one terminal which is connected with the base of the third transistor and the other terminal which is grounded.

11. A circuit as claimed in claim 6, wherein said trigger signal generating means is a fourth transistor which generates a current corresponding to a voltage of each of the saw-tooth signals and outputs the current as the trigger signal.

* * * * *